United States Patent [19]

Elgue et al.

[11] Patent Number: 4,773,921
[45] Date of Patent: Sep. 27, 1988

[54] PROCESS AND DEVICE FOR SELECTIVE EXTRACTION OF $H_2S$ FROM AN $H_2S$-CONTAINING GAS

[75] Inventors: Jean Elgue, Lons; Olivier Oliveau; Jean-Louis Peytavy, both of Lescar, all of France

[73] Assignee: Societe National Elf Aquitaine, Paris, France

[21] Appl. No.: 67,258

[22] PCT Filed: Oct. 3, 1986

[86] PCT No.: PCT/FR86/00342

§ 371 Date: Jun. 3, 1987

§ 102(e) Date: Jun. 3, 1987

[87] PCT Pub. No.: WO87/01961

PCT Pub. Date: Apr. 9, 1987

[30] Foreign Application Priority Data

Apr. 10, 1985 [FR] France ............... 85 14742

[51] Int. Cl.$^4$ .............................. B01D 53/14
[52] U.S. Cl. .......................... 55/38; 55/48; 55/49; 55/51; 55/73; 55/208; 55/228; 423/229
[58] Field of Search ............ 55/38, 48, 49, 51, 73, 55/208, 228; 423/226–229

[56] References Cited

U.S. PATENT DOCUMENTS

| | | | |
|---|---|---|---|
| 3,593,494 | 7/1971 | Durrell et al. | 55/51 |
| 3,954,425 | 5/1976 | Gunther | 55/48 X |
| 3,989,811 | 11/1976 | Hill | 423/229 X |
| 4,010,010 | 3/1977 | Ward | 55/51 X |
| 4,233,141 | 11/1980 | Beavon et al. | 423/228 X |
| 4,332,596 | 6/1982 | Ranke et al. | 55/48 X |
| 4,372,925 | 2/1983 | Cornelisse | 423/229 X |
| 4,406,868 | 9/1983 | Carter et al. | 423/228 |
| 4,409,191 | 10/1983 | Osman | 423/229 X |
| 4,478,799 | 10/1984 | Bengeser et al. | 55/73 X |
| 4,483,834 | 11/1984 | Wood | 423/228 |
| 4,522,730 | 6/1985 | Hochgesand et al. | 55/48 X |
| 4,609,384 | 9/1986 | Ranke et al. | 55/73 X |
| 4,659,553 | 4/1987 | Linde | 55/73 X |

FOREIGN PATENT DOCUMENTS 2072525 10/1981 United Kingdom ............... 423/228

*Primary Examiner*—Robert Spitzer
*Attorney, Agent, or Firm*—Weiser & Stapler

[57] ABSTRACT

The disclosed method for the selective removal of $H_2S$ from a $H_2S$-containing gas comprises contacting the gas in an absorption area (1) with a selective regeneratable absorbing liquid which absorbs the $H_2S$ and regenerating by heating the absorbing liquid laden with $H_2S$ in a regeneration area (3). The absorbing liquid coming out of the area (1) is sent to an enrichment area (2) through a conduit (25), a portion of the gases at the head of the area (3) is tapped through a valve (27) to form an acid gas flow enriched with $H_2S$ and the remainder is introduced in the area (2) through a conduit (29), the absorbing liquid is tapped at the bottom of the area (2) and introduced through a conduit (25) in the area (3) and a gas stream is collected at the head of the area (2) and is injected through a conduit (22) in the area (1). Application to the simultaneous production of a gas flow highly enriched with $H_2S$ and a gas having a fixed minimum content of $H_2S$.

17 Claims, 1 Drawing Sheet

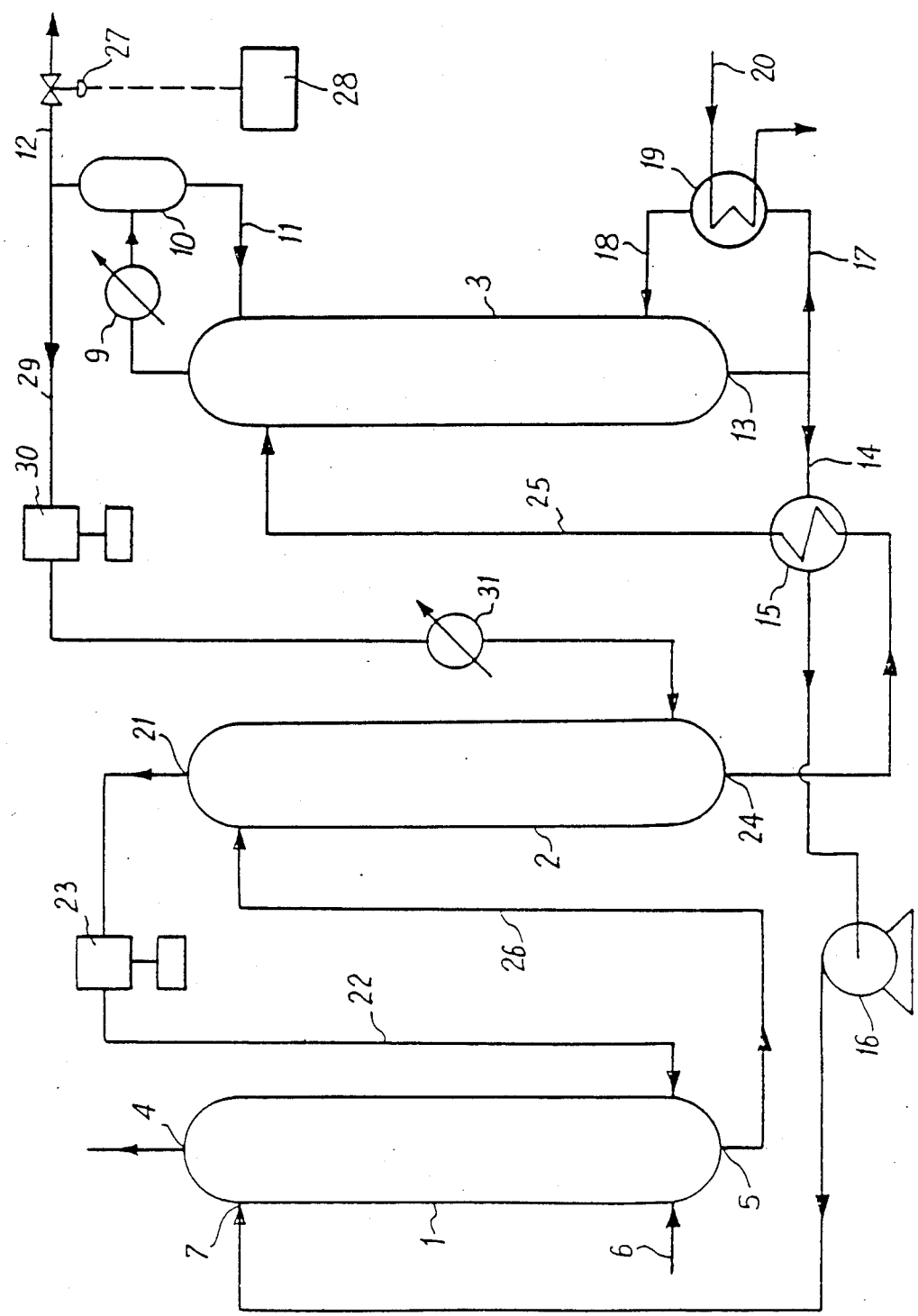

PROCESS AND DEVICE FOR SELECTIVE EXTRACTION OF H₂S FROM AN H₂S-CONTAINING GAS

The invention pertains to a process for selective extraction of $H_2S$ from an $H_2S$-containing gas. It also refers to a device for realizing this process.

Selective extraction of $H_2S$ from an $H_2S$-containing gas is usually used to eliminate the majority, or almost the entirety, of the $H_2S$ present in the said gas, to produce a desulfured gas with an $H_2S$ content below an imposed threshold and/or to generate a stream of acid gas which is rich in $H_2S$ and includes as low as possible a quantity of other acid compounds such as $CO_2$, with such a stream of acid gas being usable as a source of $H_2S$ for the production of sulfur according to the Claus process of controlled $H_2S$ oxidation or also for the synthesis of thioorganic compounds.

Such selective extraction of $H_2S$ is normally accomplished by washing the gas under treatment by means of an absorbent liquid which can be regenerated by heat and is selective for $H_2S$, i.e., an absorbent liquid which, on the one hand, is capable of retaining gaseous acid compounds such as $H_2S$ and $CO_2$ and returning practically the totality of these acid compounds by heating, and on the other hand, possesses an absorptive capacity which is distinctly greater with regard to $H_2S$ than to other acid compounds, particularly $CO_2$. The absorbent liquid fixes the gaseous acid compounds by simple physical dissolution and/or by dissolution after formation of a thermally unstable salt or complex by reaction between the said gaseous acid compounds and a basic compound, for example, an amine or alkanolamine, contained in the absorbent liquid.

In practice, the gas under treatment, which contains $H_2S$ and possibly other gaseous acid componnds such as $CO_2$, is brought into contact. in an absorption zone, with the selected absorbent liquid, circulating in countercurrent, so as to produce a gas with a reduced level of $H_2S$ which is drawn off from the top of the absorption zone. and tapping from the bottom of the said zone a stream of absorbent liquid charged with $H_2S$ and containing as little $CO_2$ and other gaseous acid compounds as possible. The said stream of absorbent liquid is then introduced into a regeneration zone in which it is subjected to conditions of temperature and pressure such as to produce almost complete release of the absorbed gaseous acid compounds, which are taken off from the top of the regeneration zone in the form of a gaseous acid effluent rich in $H_2S$, and to produce at the bottom of the regeneration zone a regenerated absorbent liquid practically free of dissolved gaseous acid compounds, which is tapped and reused as the absorbent liquid in the absorption zone.

When the gaseous acid effluent rich in $H_2S$ drawn off from the top of the regeneration zone does not contain a sufficient level of $H_2S$ to allow the said effluent to be used in the application envisaged, especially manufacture of sulfur by controlled oxidation of $H_2S$ or synthesis of thioorganic compounds, the operations are repeated, i.e., the gaseous acid effluent is treated in a second absorption zone with an absorbent liquid which is also selective for $H_2S$ and regeneratable by heating, to produce a stream of absorbent liquid highly charged with $H_2S$, which is conveyed to a second regeneration zone to be regenerated as indicated above, producing a gaseous acid effluent with a higher concentration of $H_2S$ than the gaseous acid effluent emerging from the first treatment.

Such a method of operation presents the disadvantage, among others, of requiring the use of very high-volume installations to produce a gaseous acid effluent sufficiently rich in $H_2S$ to be usable in the applications, cited above, for which it is designed, and for this reason it is very expensive.

The present invention proposes to remedy this disadvantage by offering a process for selective extraction of $H_2S$ from an $H_2S$-containing gas which makes it possible to produce a gaseous acid effluent highly enriched in $H_2S$ even if the concentration of $H_2S$ in the initial gas under treatment is low, with no need to use complex installations, the said process being most particularly suitable for the treatment of gases containing $H_2S$ such as are available at pressures which can reach several dozen bars. In addition, when the gas under treatment contains $CO_2$ in addition to the $H_2S$, the process according to the invention makes it possible to limit coabsorption of $CO_2$ by the absorbent liquid and therefore to greatly reduce the quantity of $CO_2$ passing into the gaseous effluent enriched in $H_2S$, even if the gas under treatment contains a high level of $CO_2$.

The process according to the invention for selective extraction of $H_2S$ from an $H_2S$-containing gas is of the type in which the gas under treatment is brought into contact, in an absorption zone, with an absorbent liquid which is selective for $H_2S$ and regeneratable by heating, circulating in countercurrent, so as to yield a gas with a reduced level of $H_2S$ at the top of the absorption zone and a stream of absorbent liquid charged with $H_2S$ at the bottom of the said zone, and a stream of absorbent liquid which has retained $H_2S$ is subjected to regeneration by heating, in a regeneration zone, to release the absorbed gases and form a gaseous acid effluent rich in $H_2S$ at the top of the regeneration zone and produce a regenerated absorbent liquid at the bottom of this zone, with the said regenerated absorbent liquid being tapped and recycled into the absorption zone for contact with the gas under treatment. and it is characterized by the fact that the stream of absorbent liquid charged with $H_2S$ produced in the absorption zone is fed to the upper part of a treatment zone, called the enrichment zone, and that one taps only a portion of the gaseous acid effluent available at the top of the regeneration zone to constitute a gaseous acid flow enriched in $H_2S$, and the remainder of said effluent is introduced into the enrichment zone at a point located between the bottom of said zone and the entry point of the absorbent liquid charged with $H_2S$, and that one taps the absorbent liquid at the bottom of the enrichment zone and introduces it into the regeneration zone, and that one obtains at the top of the enrichment zone a gaseous stream containing less $H_2S$ than the gaseous acid effluent available at the top of the regeneration zone, the said gaseous stream preferably being reinjected into the absorption zone between the bottom of said zone and the entry point of the regenerated absorbent liquid recycled in this zone.

The importance of the gaseous acid flow enriched with $H_2S$, which is tapped at the top of the regeneration zone, depends on the $H_2S$ concentration that one wishes to obtain in this flow, and more precisely, varies inversely with this concentration. The said gaseous acid flow enriched with $H_2S$ represents a fraction of the total output of the acid gases present in the gas under treatment, this fraction being lower, the higher the $H_2S$ concentration desired in the enriched gaseous acid flow.

The process according to the invention can be used to selectively extract the $H_2S$ contained in any type of gas which is available at a pressure between approximately 3 bars absolute and approximately 100 bars absolute. In particular, such a process is well suited for treating the various natural gases containing $H_2S$ and $CO_2$ to produce a desulfured gas with a fixed minimum $H_2S$ content and simultaneously to form a gaseous acid flow highly enriched in $H_2S$ and with a reduced level of $CO_2$, as well as for the treatment of synthesis gases containing $H_2S$ in addition to a significant quantity of $CO_2$ to eliminate almost all of the $H_2S$ while limiting coabsorption of $CO_2$.

The absorbent liquid which can be used to selectively extract the $H_2S$ can be selected from among the various absorbent liquids having sufficient selectivity for $H_2S$ and capable of being regenerated by heating and more especially by boiling. The absorbent liquid can be based on one or more solvents with a physical action such as methanol, polyethylene glycol dimethylethers, N-methyl pyrrolidone, sulfolane or phosphoric esters, or it can consist of a solvent with a chemical action consisting of an aqueous solution of one or more compounds which fix acid gases of the $H_2S$ or $CO_2$ type in the form of thermally unstable complexes or salts, such as for example, an aqueous solution of an alkanolamine such as methyl diethanolamine, triethanolamine or diisopropanolamine. The absorbent liquid can also be selected from mixtures of the two types of solvents mentioned above, such as for example, mixtures of water, diisopropanolamine and sulfolane, mixtures of water, methyl diethanolamine and sulfolane and mixtures of water, methanol and one or more amines such as methyl diethanolamine, monoethanolamine, diethanolamine and diisopropanolamine. Especially suitable as an absorbent liquid which is selective for $H_2S$ and regeneratable by heating is an aqueous solution of an alkanolamine such as methyl diethanolamine, triethanolamine and diisopropanolamine, in which the alkanolamine concentration is between 1N and 8N, preferably between 3N and 6N.

The pressure prevailing in the absorption zone essentially corresponds to that of the gas under treatment, which is injected into this zone and therefore can range between approximately 3 bars absolute and approximately 100 bars absolute.

The temperature to be selected for contact, in the absorption zone, between the gas under treatment and the absorbent liquid circulating in countercurrent is not critical and depends, among other things, on the nature of the absorbent liquid used. For example, for the aqueous solutions of alkanolamines, absorption temperatures ranging from approximately 10° C. to approximately 80° C. can be selected.

The flow rate of the absorbent liquid which circulates in the absorption zone in countercurrent to the gas under treatment is linked, among other things, to the $H_2S$ concentration of the gas under treatment and also to the quantity of $H_2S$ which can be tolerated in the desulfured gas drawn off at the top of the absorption zone. The said flow rate of the absorbent liquid is adjusted so as to yield, at the top of the absorption zone, a desulfured gas meeting the imposed specification in terms of $H_2S$ concentration.

The temperature and pressure conditions imposed on the regeneration zone are selected, bearing in mind the nature of the absorbent liquid used to fix the $H_2S$, so that the said $H_2S$ and the other gaseous acid compounds such as $CO_2$ retained by the absorbent liquid during its passage through the absorption zone and then through the enrichment zone are released, and that the absorbent liquid tapped from the bottom of the regeneration zone is practically free of dissolved gaseous acid compounds. The absolute pressure at the top of the regeneration zone is generally between 1 and 5 bars and is most often located between 1.3 and 2.5 bars. Maintenance of such a pressure requires a temperature at the bottom of the regeneration zone which is usually between 100° C. and 180° C. approximately, which corresponds to a temperature at the top of the regeneration zone ranging between approximately 80° C. and approximately 125° C.

In the enrichment zone, the absorbent liquid, which comes from the absorption zone and already contains a certain quantity of $H_2S$ and other absorbed gaseous acid compounds such as $CO_2$ extracted from the gas under treatment injected into the absorption zone, encounters a gaseous effluent formed from a portion of the gaseous acid compounds released during regeneration of the absorbent liquid in the regeneration zone, and because of its selectivity for $H_2S$, it reabsorbs an additional quantity of $H_2S$ during its passing through the enrichment zone, and because of that fact, the absorbent liquid arriving in the regeneration zone contains a substantially greater quantity of $H_2S$ and much lesser amount of the other acid compounds such as $CO_2$ than the absorbent liquid tapped from the absorption zone. Consequently, the gaseous phase present at the top of the regeneration zone has a $H_2S$ level much higher than that of the gaseous phase which was obtained by the regeneration of the absorbent liquid emerging from the absorption zone. By controlling the gaseous acid flow tapped from the regeneration zone, it is possible to adjust the $H_2S$ concentration of this gaseous flow to the desired value.

The temperatures in the enrichment zone have values intermediate between the temperature at the top of the regeneration zone and the temperature at the bottom of the absorption zone. The temperature at the bottom of the enrichment zone may advantageously be between ca. 50° C. and ca. 80° C.

The portion of the gaseous effluent, which is set apart at the top of the regeneration zone and is introduced into the enrichment zone, is advantageously cooled by indirect heat exchange to a temperature consistent with the desired temperatures in the enrichment zone before being injected into said zone.

The pressure at the top of the enrichment zone is generally between the pressure at the top of the regeneration zone and the pressure of the gas under treatment injected into the absorption zone, but one may also use a pressure at the top of the enrichment zone which is lower than the pressure at the top of the regeneration zone.

In general, the gaseous stream emerging at the top of the enrichment zone has a pressure lower than that of the gas under treatment introduced into the absorption zone, and if one chooses to inject this gaseous stream into the absorption zone, one brings said gaseous stream, by compression, at a pressure essentially equal to that of the gas under treatment before carrying out this injection.

Moreover, when the pressure at the top of the enrichment zone is higher than the pressure at the top of the regeneration zone, the gaseous effluent set apart at the top of the regeneration zone and introduced into the enrichment zone is subjected to a compression before the introduction of said effluent into this zone, so as to bring this gaseous effluent at a sufficient pressure to obtain the desired pressure at the top of the enrichment zone.

A device for implementing the process according to the invention is of the type comprising an absorption column, equipped at the top with an outlet for gases and at the bottom with an outlet for liquids, and is equipped, in its lower part, with a conduit for injecting the gas under treatment, and in its upper part, with an inlet for the absorbent liquid; and a regeneration column equipped at the top with a conduit for discharging gases and equipped, in its lower part, with a heating system and, in the bottom, with a liquid outlet, said outlet being connected by a recycling conduit with the inlet for the absorbent liquid of the absorption column, and it is characterized by the fact that it also has an enrichment column with an outlet for gases at the top, being extended by a conduit, and an outlet for the liquids at the bottom, this latter being connected by a conduit to the upper part of the regeneration column below the outlet for gases; and by the fact that the outlet for the liquids of the absorption column is extended by a conduit emerging into the enrichment column, while the conduit for discharging gases at the top of the regeneration column comprises a flow rate valve and a tap mounted above the said valve and emerging into the enrichment colun below the conduit for the liquids, which connects this column to the bottom of the absorption column.

Preferably, the conduit extending the outlet at the top of the enrichment column emerges into the absorption column below the inlet for the absorbent liquid, and if necessary, a compressor is inserted into the circuit formed by the said conduit.

A cooling system by indirect heat exchange may also be mounted on the circuit formed by the tap, which is placed on the conduit for discharging gases at the top of the regeneration column and emerges into the enrichment column. Moreover, if necessary, a compressor may also be mounted in this circuit, preferably above the cooling system. A pump may also be provided to move the absorbent liquid from the bottom of the enrichment column to the regeneration column.

The absorption, enrichment and regeneration columns, which comprise the device according to the invention, may each be of any known type commonly used for bringing a gas into contact with liquid and can, for example, consist of a plate column or even a packed column.

The number of plates or the equivalent packing height of the columns used is selected so that during operation each of the columns acts correctly so as to produce the desired $H_2S$ enrichment in the gaseous acid flow tapped from the regeneration column and so that a gas containing the imposed minimum $H_2S$ content can be drawn off at the top of the absorption column.

A better understanding of the invention will be gained by reading the following description of one of its embodiments, illustrated by the figure in the attached drawing showing a device according to the invention using plate columns.

Referring to the figure, the device for selectively extracting $H_2S$ from $H_2S$-containing gas comprises three columns, namely, an absorption column 1, an enrichment column 2 and a regeneration column 3, each of which is equipped with gas/liquid contact plates. Column 1 is equipped at the top with an outlet 4 for gases and at the bottom with an outlet 5 for liquids, and it is also equipped, in its lower part, with a conduit 6 for injecting gas under treatment and, in its upper half, with a liquid inlet 7. The regeneration column 3 is provided at the top with a condenser/separator system, which comprises a condenser 9 and a gas/liquid separator 10 provided with a tube 11 for returning condensates to the column 3 and with a discharge conduit 12 for the gases forming, a conduit for tapping the gases arriving at the top of the regeneration column, while at the bottom of the said column there is an outlet 13 for the liquids, the said outlet being connected by a recycling conduit 14, through the first exchange circuit of a heat exchanger 15 and a pump 16, to liquid inlet 7 in the absorption column 1. In its lower part, the regeneration column is connected, by the inlet 17 and outlet 18 tubes, to a boiler 19 heated by indirect heat exchange by means of saturated water vapor circulating in a tube 20.

The enrichment column 2 has, on the one hand, an outlet 21 for gases at the top, the said outlet being extended by a conduit 22 on which is mounted a compressor 23 and which emerges into the absorption column 1 in the vicinity of the conduit 6 for the inlet of the gas under treatment, and on the other hand, at the bottom an outlet 24 for the liquids, this latter being connected by a conduit 25, through the second exchange circuit of the heat exchanger 15, to the upper part of the regeneration column below the point where the tube 11 for returning condensates emerges. The outlet 5 for the liquids of the absorption column is extended by a conduit 26 which emerges at the upper part of the enrichment column below the outlet 21 for the gases.

The conduit 12 for tapping gases at the top of the regeneration column is equipped with a valve 27 with a variable opening, whose control is carried out manually or advantageously, as shown in the figure, by a regulator 28, which can be of the type ensuring either the maintenance of a constant output for the gaseous flow tapped through the valve or the maintenance of a constant $H_2S$ concentration in the said gaseous flow. Above the valve 27, the conduit 12 comprises a tapping conduit 29 on which is mounted a compressor 30, and below the compressor, a cooling system 31 functioning by indirect heat exchange, the said conduit 29 emerging into the enrichment column in the lower part of this latter.

The operation of this device can be sketched out as follows:

The gas under treatment, which contains $H_2S$ for extraction and also, for example, $CO_2$ extraction of which is to be limited as far as possible, arrives under a high pressure, for example, on the order of 50 to 80 bars absolute, at the absorption column 1 through the conduit 6 and encounters, in countercurrent, the absorbent liquid which is selective for $H_2S$ and regeneratable by heating which is introduced, through the recycling conduit 14, at the inlet point 7 of the absorption column and flows by gravity into the said column. Because of its selectivity for $H_2S$, the absorbent liquid fixes the majority of the $H_2S$ present in the gas under treatment as well as a lesser quantity of $CO_2$. A gas whose $H_2S$ content has been decreased to the desired minimum value is drawn off through the outlet 4 of the absorption column 1.

The absorbent liquid charged with the gaseous acid compounds $H_2S$ and $CO_2$ absorbed in the absorption column emerges from the said column through the outlet 5 and passes through the enrichment column 2, whose role will be explained later, to reach the regeneration column 3 by the conduit 25 after heating in the heat exchanger 15. In the regeneration column, the absorbent liquid is kept boiling under a pressure greater than atmospheric pressure, generally being between 1 and 5 bars absolute, so as to release the absorbed gaseous acid compounds and to allow them to be stripped by the vapors of the absorbent liquid. The regenerated absorbent liquid is tapped from the regeneration column through the conduit 13 at the bottom of the column and is recycled in the absorption column through the conduit 14, under the action of the pump 16, after having been cooled to an appropriate temperature for the absorption by the transfer of heat, by the heat exchanger 15, to the absorbent liquid led by the conduit 25 from the enrichment column to the regeneration column. The heat necessary to keep the absorbent liquid boiling in the regeneration column is provided by the passing of a part of the regenerated liquid tapped by the outlet 13 in the boiler 19 heated by the saturated water vapor entering the tube 20 and by the return of hot absorbent liquid to the regeneration column by the tube 18.

The gaseous acid compounds $H_2S$ and $CO_2$ released in the regeneration column are stripped by the vapors of the absorbent liquid, and after passing into the condenser 9 and then into the gas/liquid separator 10, end at the outlet for the gases of said separator and then into the conduit 12. Only a fraction of the said gaseous acid compounds is tapped from the valve 27 controlled by the regulator 28. The portion of the gaseous acid compounds not tapped by the valve 27 is introduced through the conduit 29 into the lower part of the enrichment column after having been pressed, in the compressor 30, at a sufficient pressure to obtain the desired pressure at the top of the enrichment column, for example, 5 to 15 bars absolute, and then subjected to an appropriate cooling in the cooling system 31.

In the enrichment column, the absorbent liquid, which emerges from the absorption column and therefore already contains a certain quantity of absorbed $H_2S$ and $CO_2$ extracted from the gas under treatment injected through the conduit 6 into the absorption zone, encounters a gaseous effluent formed from that part of gaseous acid $H_2S$ and $CO_2$ released during regeneration of the absorbent liquid in the regeneration column, and due to its selectivity for $H_2S$, it reabsorbs a substantial additional quantity of $H_2S$. The gaseous acid compounds not absorbed in the enrichment column are injected into the absorption column through the conduit 22 in the vicinity of the point of the inlet of the gas under treatment in the said column, after having been brought, in the compressor 23, to a pressure substantially equal to that of the gas under treatment. The absorbent liquid is highly enriched with $H_2S$ during its passage through the enrichment column, so that the absorbent liquid arriving in the regeneration column contains a substantially higher quantity of $H_2S$ and a much lower quantity of $CO_2$ than the absorbent liquid tapped through the outlet 5 of the absorption column. Because of this fact, the gaseous acid phase present at the top of the regeneration column has a $H_2S$ concentration much higher than that of the gaseous phase which would be produced by regeneration of the absorbent liquid emerging from the absorption column. The gaseous flow tapped from the valve 27 is therefore highly enriched with $H_2S$. By controlling the level of said gaseous acid flow, it is possible to adjust its $H_2S$ concentration to the desired value. Moreover, the majority of the $CO_2$ is found in the gas at a reduced $H_2S$ concentration, discharged through the outlet 4 of the absorption column.

To complete the description of the process according to the invention which has just been presented, a concrete example. not limiting in character, of an embodiment is given below.

EXAMPLE

A natural gas essentially consisting of methane and containing 1% $H_2S$ and 3% $CO_2$ by volume as acid impurities was treated using a device similar to that described with reference to the figure on the attached drawing.

In the particular device used, the absorption, enrichment and regeneration columns contained 20, 12 and 18 plates, respectively.

The absorbent liquid consisted of a 4N aqueous solution of methyl diethanolamine.

The natural gas under treatment arrived in the absorption column 1 through the conduit 6 at a flow rate of 100,000 $Nm^3/h$, an absolute pressure of 60 bars and a temperature of approximately 30° C., and in the said column, encountered in countercurrent the aqueous solution of MDEA introduced into the column at the point 7, through the recycling conduit 14, at a flow rate of 60 $m^3/h$ and a temperature of approximately 40° C.

A desulfured natural gas containing 4 ppm by volume of $H_2S$ and 0.6% $CO_2$ was drawn off through the outlet 4 of the absorption column.

The aqueous solution of MDEA was brought, at the bottom of the regeneration zone, to a temperature of approximately 130° C. by saturated water vapor under an absolute pressure of 4 bars, circulating in the tube 20 of the boiler 19, so as to maintain an absolute pressure of 1.9 bars at the top of the said regeneration column.

A portion, namely, 1,600 $Nm^3/h$, of the gaseous acid compounds released in the regeneration column was tapped from the valve 27 to form the gaseous acid flow enriched with $H_2S$, the said gaseous flow having a temperature of 40° C. and containing 63% $H_2S$ and 37% $CO_2$ by volume, while the remainder of the said gaseous acid compounds was pressed under an absolute pressure of 8 bars in the compressor 30 and then cooled to ca. 50° C. in the cooling system 31 and then entered the enrichment column 2 with an inlet of 1,330 $Nm^3/h$.

A gas stream with a temperature of ca. 60° C. and containing 30% $H_2S$ and 65% $CO_2$ and 5% $CH_4$ by volume was drawn at the top of the enrichment column 2, and this gaseous stream was injected through the conduit 22 into the absorption column 1, after having entered the said gaseous stream under a pressure of 60 bars into the compressor 23. The gas flow drawn off at the top of the enrichment column represents 1,530 $Nm^3/h$.

On the basis of the information supplied in the present example, it is evident that application of the process according to the invention to the treatment of the above-mentioned natural gas makes it possible, on the one hand, to produce a natural gas which is practically desulfured and can be delivered into distribution circuits and on the other hand, to produce a gaseous acid flow which is highly enriched in $H_2S$ (composition 63% $H_2S$ and 37% $CO_2$ by volume); such a gaseous flow can be directly used as a source of $H_2S$ for Claus sulfur plants performing controlled combustion of $H_2S$.

We claim:

1. A process for selective extraction of $H_2S$ from an $H_2S$-containing gas in which the gas under treatment is brought into contact, in an absorption zone with an absorbent liquid which is selective for $H_2S$ and regeneratable by heating, circulating in countercurrent, so as to yield a gas with a reduced level of $H_2S$ at the top of the absorption zone and a stream of absorbent liquid charged with $H_2S$ at the bottom of said zone, and in which a stream of absorbent liquid which has retained $H_2S$ is subjected to regenerate by heating, in a regeneration zone, to release the absorbed gases and form a gaseous acid effluent rich in $H_2S$ at the top of the regeneration zone and produce a regenerated absorbent liquid at the bottom of this zone, with the said regenerated absorbent liquid being tapped and recycled into the absorption zone for contact with the gas under treatment, which process comprises, feeding the stream of absorbent liquid charged with $H_2S$ produced in the absorption zone to the upper part of a treatment zone called the enrichment zone; tapping only a portion of the gaseous acid effluent available at the top of the regeneration zone to constitute a gaseous acid flow enriched with $H_2S$, and introducing the remainder of said effluent into the enrichment zone at a point located between the bottom of said zone and the inlet point of the absorbent liquid charged with $H_2S$; tapping the absorbent liquid present at the bottom of the enrichment zone and introducing said liquid into the regeneration zone, and obtaining at the top of the enrichment zone, a gaseous stream which contains substantially less $H_2S$ than the gaseous acid effluent available at the top of the regeneration zone, and drawing off the said gaseous stream.

2. A process according to claim 1, wherein the gaseous acid flow enriched with $H_2S$ tapped at the top of the regeneration zone represents a fraction of the total flow of acid gases present in the gas under treatment, this fraction being lower, the higher the $H_2S$ concentration desired in the said gaseous flow.

3. A process according to claim 1, wherein the gas under treatment is injected into the absorption zone under an absolute pressure ranging between approximately 3 bars and approximately 100 bars.

4. A process according to claim 1, wherein the pressure at the top of the enrichment zone is kept at a value between the pressure at the top of the regeneration zone and the pressure of the gas under treatment by bringing the portion of the gaseous acid effluent destined to be injected into the enrichment zone to a sufficient pressure, by compression, before carrying out the said injection, while the gaseous stream emerging at the top of the enrichment zone is reinjected into the absorption zone after having been brought by compression at a pressure substantially equal to that of the gas under treatment.

5. A process according to claim 1, wherein the temperature in the enrichment zone is kept at values intermediate between the temperature at the top of the regeneration zone and the temperature at the bottom of the absorption zone.

6. A process according to claim 5, wherein the portion of the gaseous acid effluent set apart at the top of the regeneration zone and injected into the enrichment zone is cooled prior to this injection at a temperature consistent with the desired temperature in the enrichment zone.

7. A process according to claim 1, wherein the absorbent liquid is an aqueous alkanolamine solution selectively fixing the $H_2S$.

8. A process according to claim 7, wherein the concentration of the alkanolamine absorbent solution is between 1N and 8N.

9. The process according to claim 8, wherein the concentration of the alkanolamine absorbent solution is between 3N and 6N.

10. The process according to claim 7, wherein the aqueous alkanolamine solution is an aqueous solution of methyl diethanolamine.

11. The process according to claim 1, wherein the drawn off gaseous stream is reinjected into the absorption zone between the bottom of the said zone and the inlet point of the regenerated absorbent liquid recycled in the zone.

12. A device for selective extraction of $H_2S$ from an $H_2S$-containing gas, of the type comprising an absorption column (1), equipped at the top with an outlet (4) for gases and at the bottom with an outlet (5) for liquids and equipped in its lower part with a conduit (6) for injecting the gas under treatment, and in its upper part with an inlet (7) for the absorbent liquid; and a regeneration column (3) which is equipped at the top with a conduit (12) for discharging gases and is equipped in its lower part with a heating system (19) and at the bottom with an outlet (13) for the liquids, the said outlet being connected through a recycling conduit (14) to the inlet (7) for the absorbent liquid of the absorption column, and which devices also comprises an enrichment column (2) with an outlet (21) for the gases at the top, being extended by a conduit (22), and with an outlet (24) for the liquids at the bottom, this latter being connected through a conduit (25) to the upper part of the regeneration column below the outlet for the gases; and by the fact that the outlet (5) for the liquids of the absorption column is extended by a conduit (26) emerging into the enrichment column, while the conduit (12) for discharging gases at the top of the regeneration column comprises a flow rate valve (27) and a tapping conduit (29) disposed above the said valve and emerging into the enrichment column below the conduit (26), which connects this column to the bottom of the absorption column.

13. A device according to claim 12, wherein the conduit (22) extending the outlet (21) for the gases at the top of the enrichment column emerges into the absorption column below the inlet (7) for the absorbent liquid, and optionally, a compressor (23) is inserted into the circuit formed by the said conduit (22).

14. A device according to claim 12, wherein a cooling system (31) by indirect heat exchange is mounted on the circuit formed by the tapping conduit (29), which is disposed on the conduit (12) for discharging gases at the top of the regeneration column and emerges into the enrichment column.

15. A device according to claim 14, wherein a compressor (30) is inserted into the circuit formed by the tapping conduit (29) above the cooling system (31).

16. A device according to claim 12, wherein the valve (27) is controlled by a regulator (28), which is of the type which ensures either the maintenance of a constant output for the gaseous acid flow tapped from the valve or the maintenance of a constant $H_2S$ concentration in the said gaseous flow.

17. A device according to claim 12, wherein one of the exchange circuits of a heat exchanger (15) is inserted on the recycling conduit (14), connecting the outlet (13) for the liquids of the regeneration column to the inlet (7) of the liquid in the absorption column, while the other exchange circuit is inserted on the conduit (25) binding the outlet (24) at the bottom of the enrichment zone to the upper part of the regeneration column.

* * * * *

UNITED STATES PATENT AND TRADEMARK OFFICE
CERTIFICATE OF CORRECTION

PATENT NO. : 4,773,921
DATED : September 27, 1988
INVENTOR(S) : Jean Elgue et al It is certified that error appears in the above-identified patent and that said Letters Patent is hereby corrected as shown below:

On the title page assignee should read

-- Societe National Elf Aquitaine (Production), Paris, France --.

Item (30) delete "Apr. 10, 1985" and replace by -- Oct. 4, 1985 --.

Column 1, line 37, "componnds" should read -- compounds --.

Column 5, line 28, "colun" should read -- column --.

Column 9, line 8, "regenerate" should read -- regeneration --.

Signed and Sealed this

Seventh Day of November, 1989

*Attest:*

JEFFREY M. SAMUELS

*Attesting Officer*   Acting Commissioner of Patents and Trademarks